United States Patent
Nakanishi et al.

(10) Patent No.: US 7,053,515 B2
(45) Date of Patent: May 30, 2006

(54) ROTOR FOR DYNAMO-ELECTRIC MACHINE

(75) Inventors: Toshio Nakanishi, Tokyo (JP); Masashi Ono, Tokyo (JP); Takushi Takizawa, Tokyo (JP); Atsushi Oohashi, Tokyo (JP); Katsunori Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/517,138

(22) PCT Filed: Oct. 22, 2002

(86) PCT No.: PCT/JP02/10951

§ 371 (c)(1),
(2), (4) Date: Dec. 7, 2004

(87) PCT Pub. No.: WO2004/038893

PCT Pub. Date: May 6, 2004

(65) Prior Publication Data

US 2005/0218744 A1   Oct. 6, 2005

(51) Int. Cl.
*H02K 3/00* (2006.01)
*H02K 19/26* (2006.01)

(52) U.S. Cl. .................. 310/194; 310/208; 310/263

(58) Field of Classification Search ........ 310/194–195, 310/198, 263; 242/433, 433.2
See application file for complete search history.

(56) References Cited

U.S. PATENT DOCUMENTS 3,391,879 A * 7/1968 Le Bus, Sr. .............. 242/602.2

(Continued)

FOREIGN PATENT DOCUMENTS

JP          53-24403 U       3/1978

(Continued)

*Primary Examiner*—Burton Mullins
(74) *Attorney, Agent, or Firm*—Sughrue Mion, PLLC

(57) ABSTRACT

The present invention provides a rotor for a rotary electric machine that suppresses the occurrence of winding disturbances in the process of winding a coil wire and has a coil field having a uniform outside diameter that is less likely to collapse.

A coil field of a rotor coil is constructed by winding a coil wire having a circular cross section onto an outer circumference of a drum portion of a bobbin in multiple layers so as to make columns in each of the layers equal in number in an axial direction. Odd numbered layers of the coil field are constructed such that the coil wire is wound for approximately one turn around the drum portion in contact with an inner peripheral wall surface of a first flange portion of the bobbin, then wound into a plurality of columns in an axial direction such that the columns of the coil wire contact each other, and the coil wire in a final column forms a gap S relative to an inner peripheral wall surface of a second flange portion of the bobbin, and even numbered layers of the coil field are constructed such that the coil wire is wound for approximately one turn around the drum portion in contact with an inner peripheral wall surface of the second flange portion, then wound into a plurality of columns in an axial direction such that the columns of the coil wire contact each other, and the coil wire in a final column forms a gap S relative to an inner peripheral wall surface of the first flange portion. The gap S satisfies an expression $D/4 \leq S \leq D/2$ relative to a diameter D of the coil wire.

Thus, because the occurrence of winding disturbances in the process of winding the coil wire is suppressed, the coil wire can be wound into an aligned state, enabling a coil field that is less likely to collapse to be achieved, and the outside diameter of the coil field is made uniform, also preventing damage to an electrically-insulating coating resulting from contact with claw-shaped magnetic poles.

16 Claims, 8 Drawing Sheets

U.S. PATENT DOCUMENTS

| | | | |
|---|---|---|---|
| 4,071,205 A * | 1/1978 | Wieschel | 242/602.2 |
| 4,354,645 A * | 10/1982 | Glavas et al. | 242/602.2 |
| 4,988,055 A * | 1/1991 | Sakai et al. | 242/159 |
| 5,476,229 A * | 12/1995 | Ishikawa | 242/174 |
| 5,898,252 A * | 4/1999 | Tanaka et al. | 310/214 |
| 6,037,694 A * | 3/2000 | Asao et al. | 310/261 |
| 6,621,190 B1 * | 9/2003 | Asao et al. | 310/263 |

FOREIGN PATENT DOCUMENTS

| | | |
|---|---|---|
| JP | 53-57202 U | 5/1978 |
| JP | 56-128386 U | 9/1981 |
| JP | 61-196743 A | 8/1986 |
| JP | 2-151009 A | 6/1990 |
| JP | 3-106756 A | 5/1991 |
| JP | 6-181139 A | 6/1994 |
| JP | 8-317582 A | 11/1996 |
| JP | 10-225040 A | 8/1998 |
| JP | 10-290545 A | 10/1998 |
| JP | 2001-95188 A | 4/2001 |

* cited by examiner

ROTOR FOR DYNAMO-ELECTRIC MACHINE

TECHNICAL FIELD

The present invention relates to a rotor for a rotary electric machine mounted to an automotive vehicle such as a passenger car, a truck, an electric train, etc., and particularly to a winding construction of a rotor coil wound onto a drum portion of a bobbin.

BACKGROUND ART

FIG. 17 is a front elevation explaining a conventional method for manufacturing a rotor coil of a rotary electric machine such as that described in Japanese Patent Laid-Open No. HEI 6-181139 (Gazette), for example.

In this conventional method for manufacturing a rotor coil, as shown in FIG. 17, a bobbin 1 in which a pair of flanges 1b are formed at two ends of a drum portion 1a is mounted to a spindle 2 and rotated as indicated by the arrow. Then, a wire material 4 is paid out through a nozzle 3 and wound onto the drum portion 1a of the rotating bobbin 1. Here, the rotor coil is obtained by reciprocating the nozzle 3 in the direction of the arrows such that the wire material 4 is arranged in rows and wound into multiple layers on the drum portion 1a.

However, in conventional methods for manufacturing rotor coils, no consideration has been given to relationships between axial dimensions of the drum portion 1a and a diameter of the wire material 4, positional relationships between the wire material 4 in radially-adjacent layers, etc. Thus, winding disturbances occur while winding the wire material 4 onto the drum portion 1a. An outside diameter of a coil field constituted by the wound wire material 4 after completion of winding becomes uneven in an axial direction of the bobbin 1 as a result of these winding disturbances. As a result, one disadvantage has been that the wire material 4 positioned at the outermost circumference of the coil field where the outside diameter is enlarged may come into contact with an inner circumferential wall surface of a pole, damaging an electrically-insulating coating on the wire material 4 and giving rise to insulation failure. Another disadvantage has been that balance of a load acting on the wire material 4 is poor as a result of the winding disturbances, giving rise to collapse of the coil field after completion of winding.

DISCLOSURE OF INVENTION

The present invention provides a rotor for a rotary electric machine having a coil field having a uniform outside diameter that is less likely to collapse by constructing the coil field by winding a coil wire into multiple layers on a bobbin so as to make the number of columns in each of the layers equal and by prescribing a relationship between a gap between the coil wire and a flange portion of the bobbin and an array pitch of the coil wire to suppress the occurrence of winding disturbances in the process of winding the coil wire.

In order to achieve the above object, according to one aspect of the present invention, there is provided a rotor for a rotary electric machine in which a coil field of a rotor coil is constructed by winding a coil wire having a circular cross section onto an outer circumference of a drum portion of a bobbin in multiple layers so as to make columns in each of the layers equal in number in an axial direction. Odd numbered layers of this coil field are constructed such that the coil wire is wound for approximately one turn around the drum portion in contact with an inner peripheral wall surface of a first flange portion of the bobbin, then wound into a plurality of columns in an axial direction such that the columns of the coil wire contact each other, and the coil wire in a final column forms a gap S relative to an inner peripheral wall surface of a second flange portion of the bobbin, and even numbered layers of the coil field are constructed such that the coil wire is wound for approximately one turn around the drum portion in contact with an inner peripheral wall surface of the second flange portion, then wound into a plurality of columns in an axial direction such that the columns of the coil wire contact each other, and the coil wire in a final column forms a gap S relative to an inner peripheral wall surface of the first flange portion. The gap S satisfies an expression $D/4 \leq S \leq D/2$ relative to a diameter D of the coil wire.

According to another aspect of the present invention, there is provided a rotor for a rotary electric machine in which a coil field of a rotor coil is constructed by winding a coil wire having a circular cross section onto an outer circumference of a drum portion of a bobbin in multiple layers so as to make columns in each of the layers equal in number in an axial direction. Odd numbered layers of this coil field are constructed such that the coil wire is wound for approximately one turn around the drum portion in contact with an inner peripheral wall surface of a first flange portion of the bobbin, then wound into a plurality of columns in an axial direction with a gap G between the coil wire, and the coil wire in a final column forms a gap S relative to an inner peripheral wall surface of a second flange portion of the bobbin, and even numbered layers of the coil field are constructed such that the coil wire is wound for approximately one turn around the drum portion in contact with an inner peripheral wall surface of the second flange portion, then wound into a plurality of columns in an axial direction with a gap G between the coil wire, and the coil wire in a final column forms a gap S relative to an inner peripheral wall surface of the first flange portion. The gap S satisfies an expression $S=(D+G)/2$ relative to a diameter D of the coil wire and the gap G.

BEST MODE FOR CARRYING OUT THE INVENTION

Hereinafter, the preferred embodiments of the present invention will now be explained with reference to the drawings.

Embodiment 1

Figure 1:
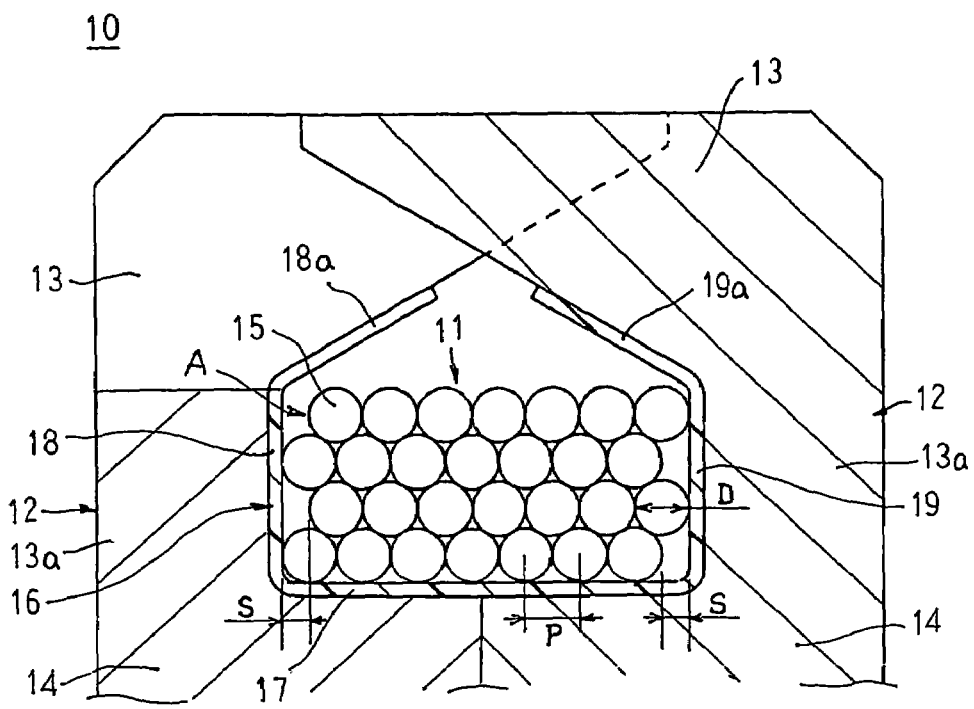
FIG. 1 is a cross section showing part of a rotor for a rotary electric machine according to Embodiment 1 of the present invention.
Figure 2:
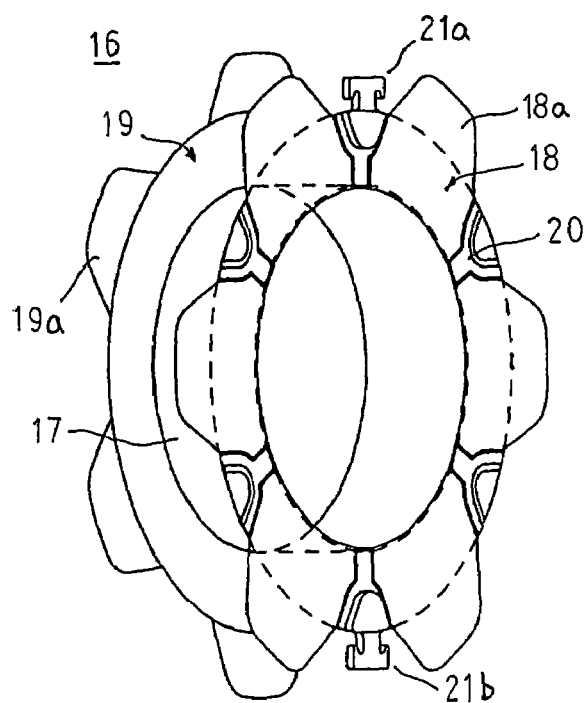
FIG. 2 is a perspective showing a bobbin used in the rotor for the rotary electric machine according to Embodiment 1 of the present invention.
Figure 3:
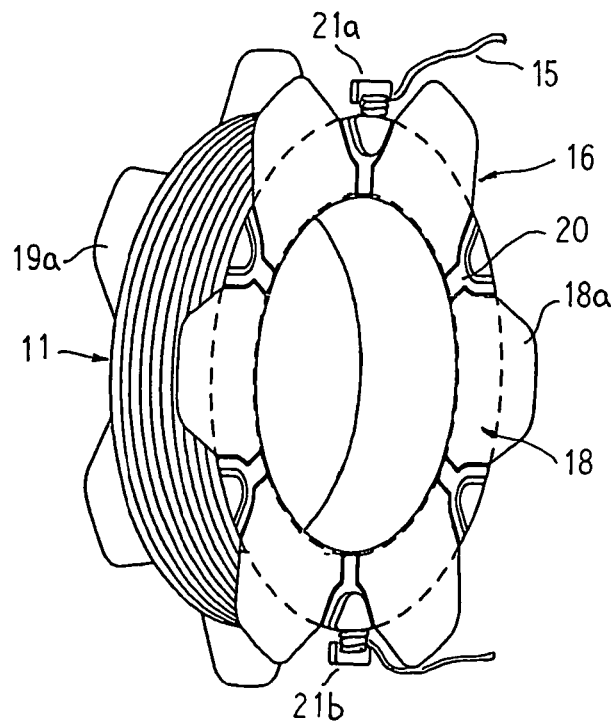
FIG. 3 is a perspective showing a rotor coil installed on the bobbin in the rotor for the rotary electric machine according to Embodiment 1 of the present invention.
Figure 4:
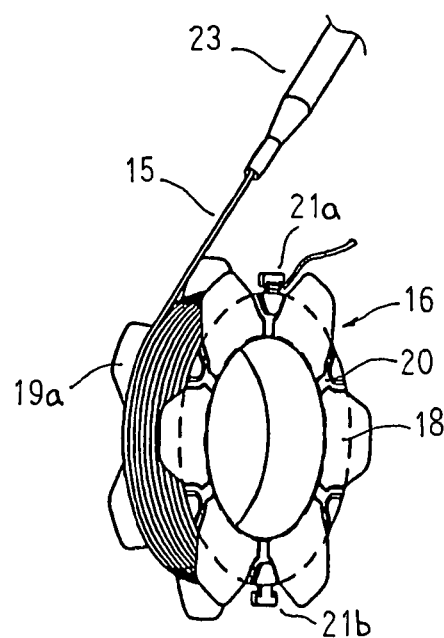
FIG. 4 is a perspective explaining a method for installing the rotor coil in the rotor for the rotary electric machine according to Embodiment 1 of the present invention.
Figure 5:
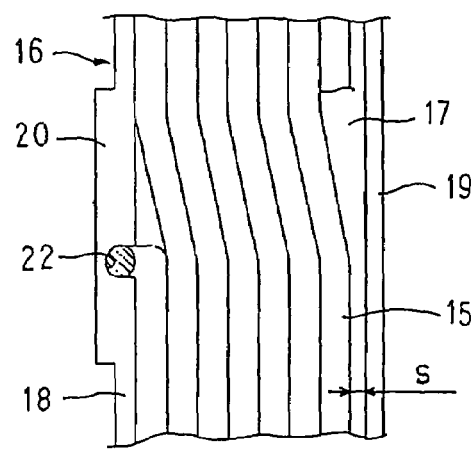
FIG. 5 is a process diagram explaining the method for installing the rotor coil in the rotor for the rotary electric machine according to Embodiment 1 of the present invention.
Figure 6:
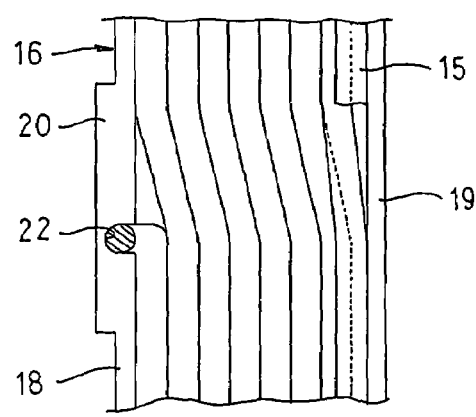
FIG. 6 is a process diagram explaining the method for installing the rotor coil in the rotor for the rotary electric machine according to Embodiment 1 of the present invention.
Figure 7:
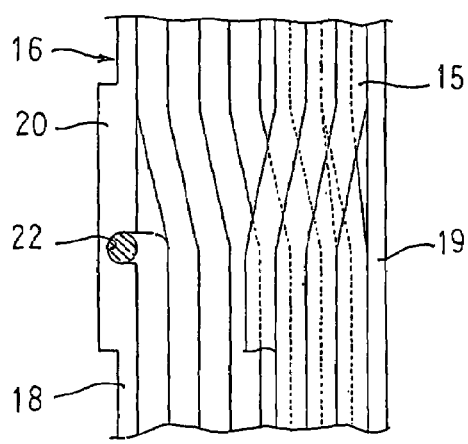
FIG. 7 is a process diagram explaining the method for installing the rotor coil in the rotor for the rotary electric machine according to Embodiment 1 of the present invention.
Figure 8:
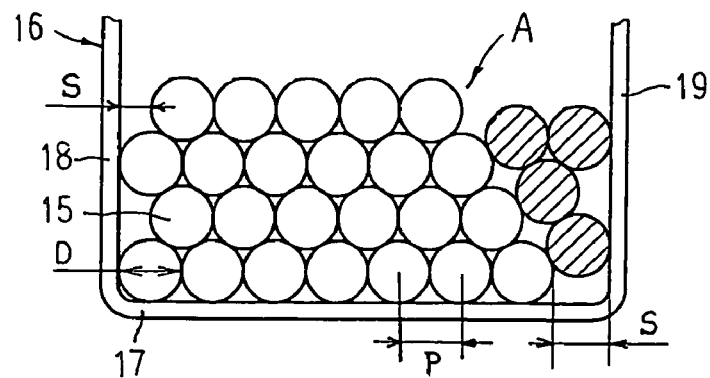
FIG. 8 is a cross section showing the rotor coil installed in the rotor for the rotary electric machine according to Embodiment 1 of the present invention.
Figure 9:
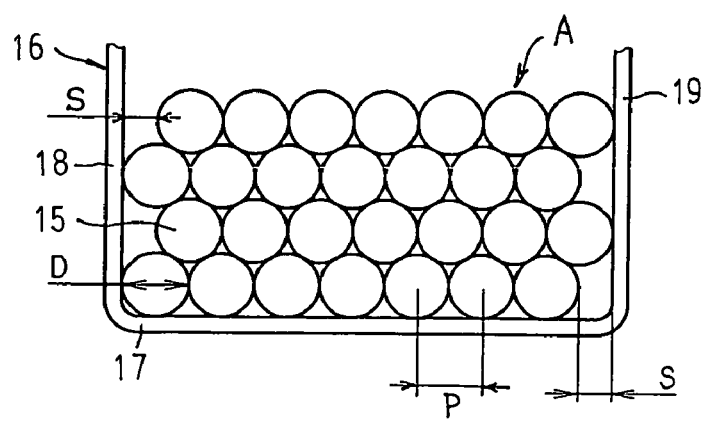
FIG. 9 is a cross section showing the rotor coil installed in the rotor for the rotary electric machine according to Embodiment 1 of the present invention.
Figure 10:
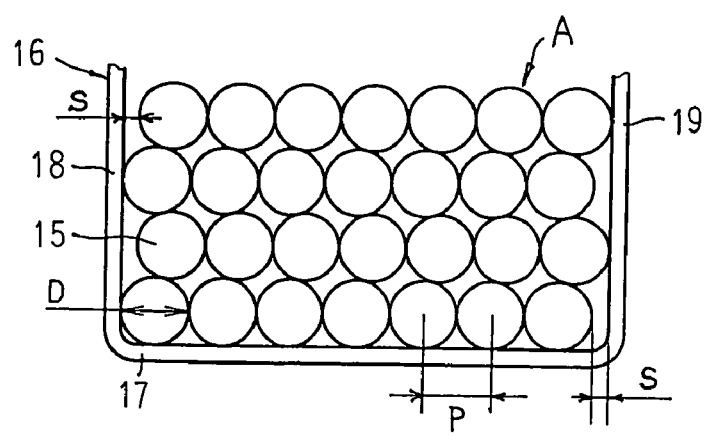
FIG. 10 is a cross section showing the rotor coil installed in the rotor for the rotary electric machine according to Embodiment 1 of the present invention.

FIG. 1 is a cross section showing part of a rotor for a rotary electric machine according to Embodiment 1 of the present invention, FIG. 2 is a perspective showing a bobbin used in the rotor for the rotary electric machine according to Embodiment 1 of the present invention, FIG. 3 is a perspective showing a rotor coil installed on the bobbin in the rotor for the rotary electric machine according to Embodiment 1 of the present invention, FIG. 4 is a perspective explaining a method for installing the rotor coil in the rotor for the rotary electric machine according to Embodiment 1 of the present invention, and FIGS. 5 to 7 are process diagrams explaining the method for installing the rotor coil in the rotor for the rotary electric machine according to Embodiment 1 of the present invention. FIGS. 8 to 10 are cross sections showing the rotor coil installed in the rotor for the rotary electric machine according to Embodiment 1 of the present invention, FIG. 8 showing a case in which S>D/2, FIG. 9 a case in which S=D/2, and FIG. 10 a case in which S<D/4. Moreover, S is a gap between a coil wire 15 and an inner peripheral wall surface of first and second flange portions 18 and 19 in respective layers, and D is a diameter of the coil wire 15.

A rotor 10 for a rotary electric machine, as shown in FIG. 1, is constituted by: a rotor coil 11 for generating a magnetic flux on passage of an electric current; and a pair of pole cores 12 disposed so as to cover the rotor coil 11, magnetic poles being formed in the pair of pole cores 12 by the magnetic flux generated by the rotor coil 11.

Each of the pole cores 12 is made of iron, a plurality of claw-shaped magnetic poles 13 having a tapered shape being formed at a uniform angular pitch in a circumferential direction on an outer circumferential edge portion of a cylindrical base portion 14 such that a direction of taper of each of the claw-shaped magnetic poles 13 is aligned in an axial direction. The pair of pole cores 12 are fixed to a shaft (not shown) facing each other such that the claw-shaped magnetic poles 13 intermesh with each other with end surfaces of the base portions 14 placed in contact with each other. Moreover, although not shown, shaft insertion apertures are disposed through the base portions 14 at central axial positions.

A bobbin 16, as shown in FIG. 2, is prepared by shaping in a metal mold a material in which glass fiber is added to a thermoplastic resin such as nylon 66, etc., and is constructed into an annular body having an angular C-shaped cross section in which first and second flange portions 18 and 19 are disposed so as to extend radially outward from two axial end portions of a drum portion 17. Strengthening ribs 20 are formed by increasing a wall thickness of the first and second flange portions 18 and 19. In this case, the ribs 20 are formed on the first and second flange portions 18 and 19 at six positions at a uniform angular pitch in a circumferential direction. Electrically-insulating tongue segments 18a and 19a are disposed on outer circumferential edges of the first and second flange portions 18 and 19 at a uniform angular pitch in a circumferential direction, the tongue segments 18a and 19a being bent so as to lie alongside inner circumferential wall surfaces of the claw-shaped magnetic poles 13 when the bobbin 16 is mounted to the pair of pole cores 12 to prevent direct contact between the rotor coil 11 and the claw-shaped magnetic poles 13. In addition, a pair of retaining portions 21a and 21b are disposed upright on outer circumferential edges of the first flange portion 18, and a groove 22 described below is recessed into an inner peripheral wall surface of the first flange portion 18 so as to extend from an outer circumferential edge of the first flange portion 18 in the vicinity of the securing portion 21a to the drum portion 17.

This bobbin 16 is housed inside a space formed by the claw-shaped magnetic poles 13 and the base portions 14 of the pair of pole cores 12 by mounting the drum portion 17 to the base portions 14 so as to be held between root portions 13a of the claw-shaped magnetic poles 13 from two sides (left and right in FIG. 1). The rotor coil 11 is constructed by winding a coil wire 15 into multiple layers on an outer circumference of the drum portion 17 so as to make the columns in each of the layers equal in number in an axial direction. Here, the coil wire 15 is wound into four layers of seven columns.

A method for installing the rotor coil 11 will now be explained.

The coil wire 15 is manufactured by coating an electrically-insulating coating such as a polyimide resin, etc., onto a surface of a core material such as copper, etc., having a circular cross section. This coil wire 15 is paid out through a nozzle 23, a leading end thereof is wound onto a securing portion 21a of the bobbin 16, which is mounted to a spindle (not shown), and the coil wire 15 is led to the drum portion 17 through the groove 22.

As shown in FIG. 4, the coil wire 15 is wound onto the drum portion 17 by rotating the bobbin 16 while paying the coil wire 15 out through the nozzle 23. Here, the nozzle 23 is moved in the axial direction of the bobbin 16 as a first layer of the coil wire 15 is wound onto the drum portion 17. The coil wire 15 in this first layer, as shown in FIG. 5, extends outward from the groove 22 onto the drum portion 17, then makes approximately one turn around the drum portion 17 while contacting the inner peripheral wall surface of the first flange portion 18, is then shifted toward the second flange portion 19 by one diameter of the coil wire 15 and makes approximately one turn around the drum portion 17 while contacting the first turn of the coil wire 15, making a total of seven turns around the drum portion 17 in a similar manner. Here, a gap S is formed between the seventh turn of the coil wire 15 in the first layer and the inner peripheral wall surface of the second flange portion 19.

Next, a second layer of the coil wire 15 is wound on top of the coil wire 15 in the first layer. First, the coil wire 15, as shown in FIG. 6, is raised onto the seventh turn of the coil wire 15, and makes approximately one turn in contact with the inner peripheral wall surface of the second flange portion 19. Then, as shown in FIG. 7, the coil wire 15 is shifted toward the first flange portion 18 by one diameter of the coil wire 15 and makes approximately one turn around the drum portion 17 while contacting the first turn in the second layer of the coil wire 15 and contacting the sixth turn and the seventh turn in the first layer of the coil wire 15, making a total of seven turns around the drum portion 17 in a similar manner.

This process of winding the coil wire 15 is performed repeatedly, and the coil wire 15 is wound onto the drum portion 17 to a height equivalent to a height of the root portion 13*a* of the claw-shaped magnetic poles 13 to construct a coil field A. In Embodiment 1, the coil field A is constructed by winding the coil wire 15 into seven columns and four layers. Then, the coil wire 15 projecting out of the nozzle 23 is cut, and the cut end of the coil wire 15 is wound onto a securing portion 21*b* to obtain the rotor coil 11 shown in FIG. 3.

In the rotor coil 11 prepared in this manner, as shown in FIG. 1, the coil wire 15 is installed on the drum portion 17 of the bobbin 16 in four layers of seven columns. In odd numbered layers, the coil wire 15 is wound such that the first turn is wound in contact with the inner peripheral wall surface of the first flange portion 18, then a total of seven turns are made so as to contact each other, and there is a gap S between the seventh turn of the coil wire 15 and the inner peripheral wall surface of the second flange portion 19. In even numbered layers, on the other hand, the coil wire 15 is wound such that the first turn is wound in contact with the inner peripheral wall surface of the second flange portion 19, then a total of seven turns are made so as to contact each other, and there is a gap S between the seventh turn of the coil wire 15 and the inner peripheral wall surface of the first flange portion 18. Because the first turn of the coil wire 15 in the second layer, for example, is wound in contact with the inner peripheral wall surface of the second flange portion 19, the first turn of the coil wire 15 in the second layer presses the seventh turn of the coil wire 15 in the first layer toward the first flange portion 18 and acts to place the seven turns of the coil wire 15 in the first layer in close contact with each other. Thus, a state of close contact of the coil wire 15 wound into the first layer is ensured even if the coil wire 15 is wound sequentially into a second turn and a third turn in the second layer. Moreover, the state of close contact of the coil wire 15 wound into the lower layers is also similarly ensured when the coil wire 15 is wound into the third layer and the fourth layer. In other words, an aligned state of the coil wire 15 in each of the layers of the coil field A is ensured.

Thus, because the coil field A of the rotor coil 11 is constructed so as to make the columns in each of the layers equal in number, and in the odd numbered layers, the coil wire 15 contacts the inner peripheral wall surface of the first flange portion 18, has a gap S relative to the inner peripheral wall surface of the second flange portion 19, and is arranged in seven columns at an array pitch P (=D) from the first flange portion 18 toward the second flange portion 19 so as to be in contact with each other, and in the even numbered layers, the coil wire 15 contacts the inner peripheral wall surface of the second flange portion 19, has a gap S relative to the inner peripheral wall surface of the first flange portion 18, and is arranged in seven columns at an array pitch P (=D) from the second flange portion 19 toward the first flange portion 18 so as to be in contact with each other, the outside diameter of the coil field A does not become uneven relative to the axial direction of the bobbin 16. As a result, when the rotor 10 is prepared with the rotor coil 11 mounted to the pole core 12, the occurrence of damage to the electrically-insulating coating of the coil wire 15 resulting from the coil wire 15 positioned at the outermost radial portions of the coil field A coming into contact with inner circumferential wall surfaces of the claw-shaped magnetic poles 13 can be suppressed, enabling electrical insulation to be improved. Furthermore, deterioration in the balance of the load acting on the coil wire 15 can also be suppressed, preventing the coil field A from collapsing after completion of winding, etc.

Because the bobbin 16 is prepared by shaping in a metal mold a material in which glass fiber is added to a thermoplastic resin such as nylon 66 etc., the strength of the bobbin 16 is increased, suppressing the likelihood that the first and second flange portions 18 and 19 will be pushed by the coil wire 15 and collapse outward in the process of winding the coil wire 15. In addition, because the ribs 20 are formed on the first and second flange portions 18 and 19, the strength of the bobbin 16 is further increased, reliably preventing the outward collapse of the first and second flange portions 18 and 19.

Moreover, outward collapse of the first and second flange portions 18 and 19 would bring about expansion of the gap S, giving rise to winding disturbances while winding the coil wire 15, and the coil wire 15 would no longer be wound in an aligned state. As a result, the outside diameter of the coil field A would become irregular in an axial direction, making the balance of the load acting on the coil wire 15 deteriorate.

Next, the gap S will be explained with reference to FIGS. 8 to 10. From FIGS. 8 to 10, it can be seen that a height from the drum portion 17 at a point of contact between the first turn of the coil wire 15 in the second layer and the seventh turn of the coil wire 15 in the first layer is reduced as the gap S increases.

In FIG. 9, a winding construction is shown in which each of the layers of the coil field A is constructed such that the coil wire 15 is arranged in seven columns at an array pitch P (=D) and the gap S between the seventh turn of the coil wire 15 and the first flange portion 18 (or the second flange portion 19) is D/2. In this winding construction, the coil wire 15 in intermediate turns (excluding the first turn and the last turn) in intermediate layers (excluding the first layer and the uppermost layer) contacts six turns of coil wire 15 in a circumferential direction. In other words, the outer circumferential surface of the coil wire 15 is in contact with adjacent turns of coil wire 15 at six points having a uniform angular pitch, and is wound in an extremely stable state with good balance of the load acting on each of the turns of coil wire 15. Furthermore, because the coil wire 15 in the first turn in each of the layers contacts the first flange portion 18 or the second flange portion 19, when the coil wire 15 is wound into the first turn in the second layer, for example, the coil wire 15 wound in the first layer is pressed toward the first flange portion 18, but this pressure is received by the first flange portion 18 through the first turn of the coil wire 15, and the aligned state of the coil wire 15 in the first layer will not collapse. Thus, because the coil wire 15 can be wound into a stable state, the occurrence of winding disturbances in the winding process is reliably suppressed, enabling the coil wire 15 to be wound into an aligned state. As a result, a coil field A in which the outside diameter is uniform in an axial direction can be prepared simply, and a coil field A in which collapse is unlikely to occur is able to be achieved. Furthermore, because the coil wire 15 can be wound into the winding space of the bobbin 16 without waste, the number of winds of the coil wire 15 can be increased. In addition, because the coil wire 15 contacts six adjacent turns of coil wire 15 in a circumferential direction, heat generated in the coil wire 15 when the rotor coil 11 is energized is diffused through the adjacent turns of coil wire 15 to the surrounding area, improving the heat dissipation characteristics of the rotor coil 11, thereby suppressing temperature increases in the rotor coil 11.

In FIG. 8, a winding construction is shown in which each of the layers of the coil field A is constructed such that the coil wire 15 is arranged in seven columns at an array pitch P (=D) and the gap S between the seventh turn in the first layer of the coil wire 15 and the first flange portion 18 is greater than D/2 (S>D/2). In this winding construction, because the gap S is greater than D/2, the height of the first turn of coil wire 15 in the second layer from the drum portion 17 is lower than other turns of the coil wire 15 in the second layer, and the first turn is separated from the second turn of coil wire 15. As the layer number increases, the number of turns of coil wire 15 with reduced height in the same layer increases. As a result, as indicated by the oblique lines in FIG. 8, winding disturbances arise partway through the process of winding the coil wire 15, exacerbating irregularities in the outside diameter of the coil field relative to the axial direction of the bobbin 16 and also increasing deterioration in the balance of the load acting on the coil wire 15. For example, the coil wire 15 wound into the first turn in the third layer presses the seventh turn of the coil wire 15 in the second layer toward the second flange portion 19. Here, because the first turn and the second turn of the coil wire 15 in the second layer separates and the first turn of the coil wire 15 in the second layer is positioned below the second turn of the coil wire 15 in the second layer, the force pressing the seventh turn of the coil wire 15 in the second layer toward the second flange portion 19 cannot be received by the second flange portion 19 through the first turn of the coil wire 15 in the second layer. Thus, the seventh turn of coil wire 15 in the second layer is moved beyond the second turn of the coil wire 15 in the first layer due to that pressure, making it impossible to wind the coil wire 15 into an aligned state. In addition, in a vicinity of the portion in which winding disturbances occur, contact positions in a circumferential direction of the coil wire 15 are reduced in number compared to the winding construction shown in FIG. 9 above. Thus, heat generated in the coil wire 15 when the rotor coil 11 is energized is less likely to be diffused through the adjacent turns of coil wire 15 to the surrounding area, thereby degrading the heat dissipation characteristics of the rotor coil 11 and giving rise temperature increases in the rotor coil 11.

In FIG. 10, a winding construction is shown in which each of the layers of the coil field A is constructed such that the coil wire 15 is arranged in seven columns at an array pitch P (=D) and the gap S between the seventh turn of the coil wire 15 and the first flange portion 18 (or the second flange portion 19) is less than D/4 (S<D/4). In this winding construction, because the gap S is less than D/4, the coil wire 15 in each of the layers contacts the coil wire 15 in the lower layer in a vicinity of apex portions. As a result, the number of layers in the coil field A is reduced, and the number of winds of coil wire 15 decreases, reducing the magnetomotive force generated by the rotor coil 11. Furthermore, the coil wire 15 can be moved over the coil wire 15 in the lower layers with a small force, increasing the danger of the occurrence of winding disturbances partway through the process of winding the coil wire 15, and also increasing the danger of the occurrence of collapse of the coil field A. In addition, because the coil wire 15 in the intermediate turns of the intermediate layers contacts only four adjacent turns of coil wire 15 in a circumferential direction, heat generated in the coil wire 15 when the rotor coil 11 is energized is less likely to be diffused through the adjacent turns of coil wire 15 to the surrounding area, thereby degrading the heat dissipation characteristics of the rotor coil 11 and giving rise temperature increases in the rotor coil 11.

Thus, it is desirable for the gap S to be set to greater than or equal to D/4 and less than or equal to D/2.

Particularly if the gap S is set to D/2, because the coil wire 15 can be wound into a stable state, the occurrence of winding disturbances in the winding process is suppressed, enabling the coil wire 15 to be wound into an aligned state. As a result, a coil field A in which the outside diameter is uniform in an axial direction can be prepared simply, and a coil field A in which collapse is unlikely to occur is able to be achieved. In addition, the number of winds of coil wire 15 is increased, enabling the magnetomotive force generated by the rotor coil 11 to be increased.

Embodiment 2

Figure 11:
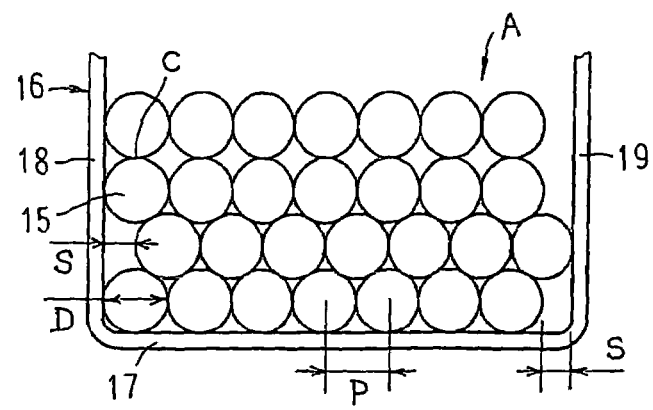
FIG. 11 is a cross section showing a rotor coil installed in a rotor for a rotary electric machine according to Embodiment 2 of the present invention.

FIG. 11 is a cross section showing a rotor coil installed in a rotor for a rotary electric machine according to Embodiment 2 of the present invention. Moreover, FIG. 11 is a longitudinal section passing through a crossover point C arising when a coil wire 15 is wound into a fourth layer.

In Embodiment 2, a coil field A of a rotor coil 11, as shown in FIG. 11, is constructed such that a coil wire 15 is installed on a drum portion 17 of a bobbin 16 in four layers of seven columns, and crossover points C do not overlap in a radial direction.

In odd numbered layers of the coil field A, the coil wire 15 is wound such that a first turn is wound in contact with the inner peripheral wall surface of the first flange portion 18, then a total of seven turns are made at an array pitch P (=D) so as to contact each other, and there is a gap S (=D/2) between the seventh turn of the coil wire 15 and the inner peripheral wall surface of the second flange portion 19. In even numbered layers of the coil field A, on the other hand, the coil wire 15 is wound such that the first turn is wound in contact with the inner peripheral wall surface of the second flange portion 19, then a total of seven turns are made at an array pitch P (=D) so as to contact each other, and there is a gap S (=D/2) between the seventh turn of the coil wire 15 and the inner peripheral wall surface of the first flange portion 18. Shift starting positions at which the coil wire 15 is shifted by the array pitch P in an axial direction are offset in a circumferential direction for each of the layers. In other words, crossover points C arising when the coil wire 15 is wound into the second layer, the third layer, and the fourth layer are distributed in a circumferential direction, and do not overlap each other in a radial direction.

Moreover, when the coil wire 15 is wound into each of the layers (except for the first layer), as the coil wire 15 is shifted in an axial direction by the array pitch P from an $n_1$th turn and wound into an $(n_1+1)$th turn, it crosses over an apex portion of the coil wire 15 in the lower layer. These crossover points C are points where a coil wire 15 crosses over the apex portion of the coil wire 15 in a lower layer.

In a rotor coil, if the coil field A is constructed so that the crossover points C overlap in a radial direction, the outside diameter of the coil field A in the portion where the crossover points C overlap increases. The larger the amount of overlap at the crossover points C, the greater the outside diameter of the coil field A in the portion where the crossover points C overlap becomes. As a result, when a rotor is prepared with the rotor coil mounted to a pole core 12, the electrically-insulating coating of the coil wire 15 may be damaged by the coil wire 15 positioned at the outermost radial portions of the coil field A where the crossover points C overlap coming into contact with the inner circumferential wall surfaces of the claw-shaped magnetic poles 13. Furthermore, to avoid contact between the coil wire 15 positioned at the outermost radial portion of the coil field A and the inner circumferential wall surface of the claw-shaped magnetic poles 13 in the portion where the crossover points C overlap, it may be necessary to reduce the number of layers in the coil field A, decreasing the number of winds of coil wire 15.

However, in Embodiment 2, because the crossover points C do not overlap in a radial direction, the crossover points C, which increase the outside diameter of the coil field A are distributed in a circumferential direction, thereby providing a coil field A having a uniform outside diameter. As a result, because the number of layers in the coil field A able to avoid contact between the coil wire 15 and the inner circumferential wall surfaces of the claw-shaped magnetic poles 13 can be increased, the occurrence of damage to the electrically-insulating coating of the coil wire 15 is suppressed, and a rotary electric machine having an increased number of winds of coil wire 15 can be obtained.

Moreover, in FIG. 11, the crossover points C arising when the coil wire 15 is wound into the fourth layer overlap in an axial direction, but overlapping of the crossover points C in an axial direction does not contribute to any increase in the outside diameter of the coil field A.

Embodiment 3

Figure 12:
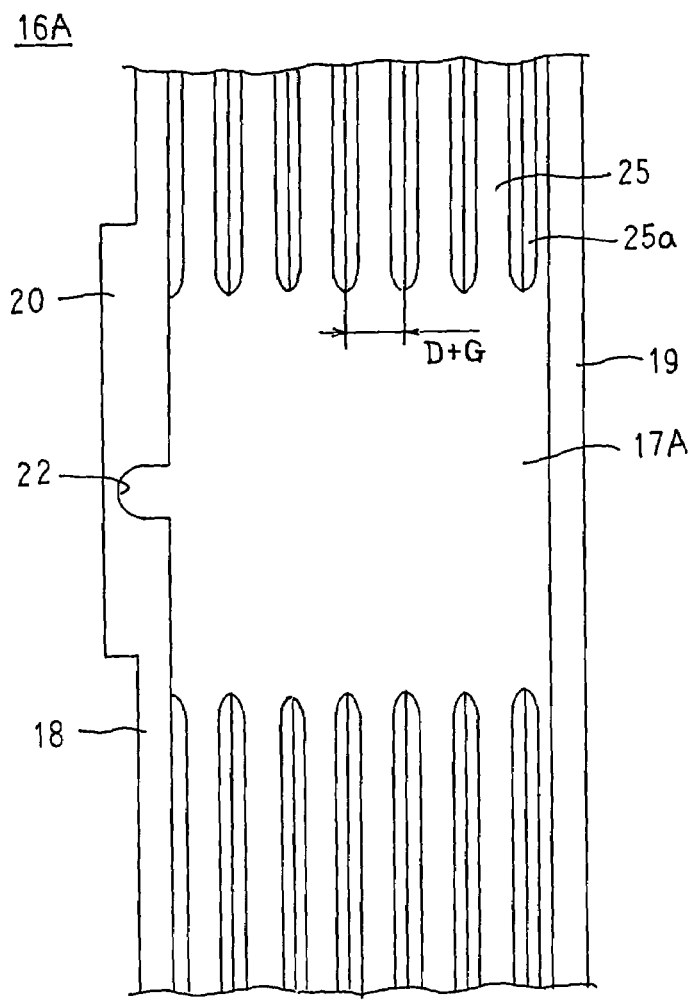
FIG. 12 is a plan showing part of a bobbin in a rotary electric machine according to Embodiment 3 of the present invention.
Figure 13:
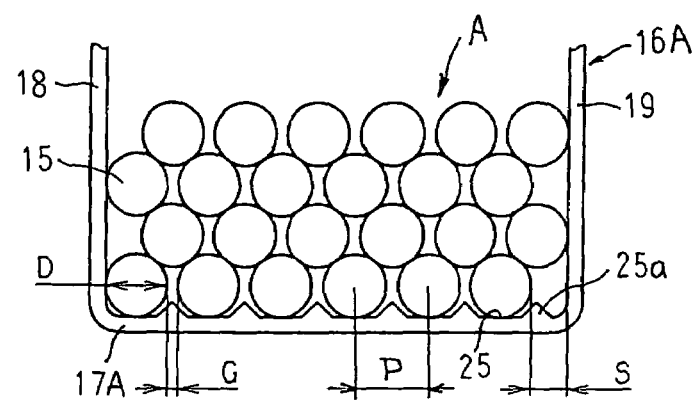
FIG. 13 is a cross section explaining an installed state of a rotor coil in the rotary electric machine according to Embodiment 3 of the present invention.

FIG. 12 is a plan showing part of a bobbin in a rotary electric machine according to Embodiment 3 of the present invention, and FIG. 13 is a cross section explaining an installed state of a rotor coil in the rotary electric machine according to Embodiment 3 of the present invention.

In Embodiment 3, as shown in FIG. 12, ridge portions 25a making approximately one turn around a drum portion 17A of a bobbin 16A are disposed at an array pitch of (D+G) in an axial direction on an outer circumferential wall surface of the drum portion 17A. Thus, six guiding grooves 25 partitioned by the ridge portions 15a for guiding coil wire are disposed side by side in an axial direction at an array pitch of (D+G) on the drum portion 17A. An internal shape of each of the guiding grooves 25 is formed so as to be equivalent to an external shape of the coil wire 15. Each of the ridge portions 25a is purposely not formed over a predetermined circumferential range of the drum portion 17A so that adjacent guiding grooves 25 communicate with each other. A securing portion 21a is positioned radially outside the region where the ridge portions 25a are not formed. Here, G is a gap between the coil wire 15 wound into each of the layers. Moreover, the bobbin 16A is constructed in a similar manner to the bobbin 16 in Embodiment 1 above except for the fact that the guiding grooves 25 are formed on the drum portion 17A.

Next, a winding construction of the rotor coil according to Embodiment 3 will be explained with reference to FIG. 13.

First, the coil wire 15 extends outward from the groove 22 onto the drum portion 17A, is then led inside the first guiding groove 25, and makes approximately one turn around the drum portion 17A while contacting the inner peripheral wall surface of the first flange portion 18. Next, the coil wire 15 is shifted toward the second flange portion 19 by (D+G) in the region where the ridge portions 25a are not formed, is led inside the second guiding groove 25, and makes approximately one turn around the drum portion 17. The coil wire 15 makes a total of six turns around the drum portion 17A in a similar manner. Here, the coil wire 15 is arranged at an array pitch P (=D+G), and a gap S (=(D+G)/2) is formed between the sixth turn of the coil wire 15 and the inner peripheral wall surface of the second flange portion 19.

Next, a second layer of the coil wire 15 is wound on the coil wire 15 in the first layer. First, the coil wire 15 is raised onto the sixth turn of the coil wire 15 in the first layer, and makes approximately one turn in contact with the inner peripheral wall surface of the second flange portion 19. Then, the coil wire 15 is shifted toward the first flange portion 18 by (D+G) and makes approximately one turn around the drum portion 17A while contacting the sixth turn and the fifth turn of the coil wire 15 in the first layer, making a total of six turns around the drum portion 17A in a similar manner. Here, the coil wire 15 is arranged at an array pitch P (=D+G), and a gap S (=(D+G)/2) is formed between the sixth turn of the coil wire 15 and the inner peripheral wall surface of the first flange portion 18.

This process of winding the coil wire 15 is performed repeatedly, and the coil wire 15 is wound onto the drum portion 17A to a height equivalent to a height of the root portion 13a of the claw-shaped magnetic poles 13 to construct a coil field A.

In the coil field A of a rotor coil prepared in this manner, as shown in FIG. 13, in odd numbered layers, the coil wire 15 is wound such that a first turn is wound in contact with the inner peripheral wall surface of the first flange portion 18, then a total of six turns are made at an array pitch P (=D+G), and there is a gap S (=((D+G)/2) between the sixth turn of the coil wire 15 and the inner peripheral wall surface of the second flange portion 19, and in even numbered layers, the coil wire 15 is wound such that the first turn is wound in contact with the inner peripheral wall surface of the second flange portion 19, then a total of six turns are made at an array pitch P (=D+G), and there is a gap S (=(D+G)/2) between the sixth turn of the coil wire 15 and the inner peripheral wall surface of the first flange portion 18. In each of the layers, the coil wire 15 is arranged so as to have a gap G.

According to Embodiment 3, because the coil wire 15 in the first layer (the lowest layer) is wound onto the drum portion 17A so as to be housed inside guiding grooves 25 having an internal shape equivalent to an external shape of the coil wire 15, movement of the coil wire 15 in an axial direction is prevented by the guiding grooves 25, maintaining an aligned state. Furthermore, because the coil wire 15 in each of the layers is arranged at an array pitch P (=D+G), and in the odd numbered layers, the first turn of the coil wire 15 contacts the inner peripheral wall surface of the first flange portion 18, and the sixth turn (the final turn) of the coil wire 15 is separated from the inner peripheral wall surface of the second flange portion 19 by a gap S (=(D+G)/2), and in the even numbered layers, the first turn of the coil wire 15 contacts the inner peripheral wall surface of the second flange portion 19, and the sixth turn (the final turn) of the coil wire 15 is separated from the inner peripheral wall surface of the first flange portion 18 by a gap S (=(D+G)/2), the coil wire 15 in each of the layers is positioned at a uniform height from the drum portion 17A, and each of the intermediate turns of coil wire 15 in the intermediate layers contact four turns of coil wire 15 in upper and lower layers in a symmetrical positional relationship relative to a line passing through a central axis of the coil wire 15 and a central axis of the drum portion 17A in a cross section through the central axis of the coil wire 15, improving the balance of the load acting on each of the turns of coil wire 15. Thus, the coil wire 15 can be wound onto the drum portion 17A in a stable state without winding disturbances arising. As a result, a coil field A in which the outside diameter is uniform in an axial direction can be prepared simply, and a coil field A in which collapse is unlikely to occur is able to be achieved. In addition, because the coil wire 15 can be wound into the winding space of the bobbin 16 without waste, the number of winds of the coil wire 15 can be increased.

Here, when consideration is given to irregularities in coil wire diameter due to irregularities in coil wire tension from a coil winding machine, it is desirable for the array pitch P of the guiding grooves 25 to be set to 1 to 1.04 times ($1 \leq P \leq 1.04$ D) the diameter of the coil wire.

Moreover, it goes without saying that guiding grooves 25 according to Embodiment 3 may also be applied to the rotors of Embodiments 1 and 2 above. In that case, the array pitch of the guiding grooves 25 is D.

Figure 14:
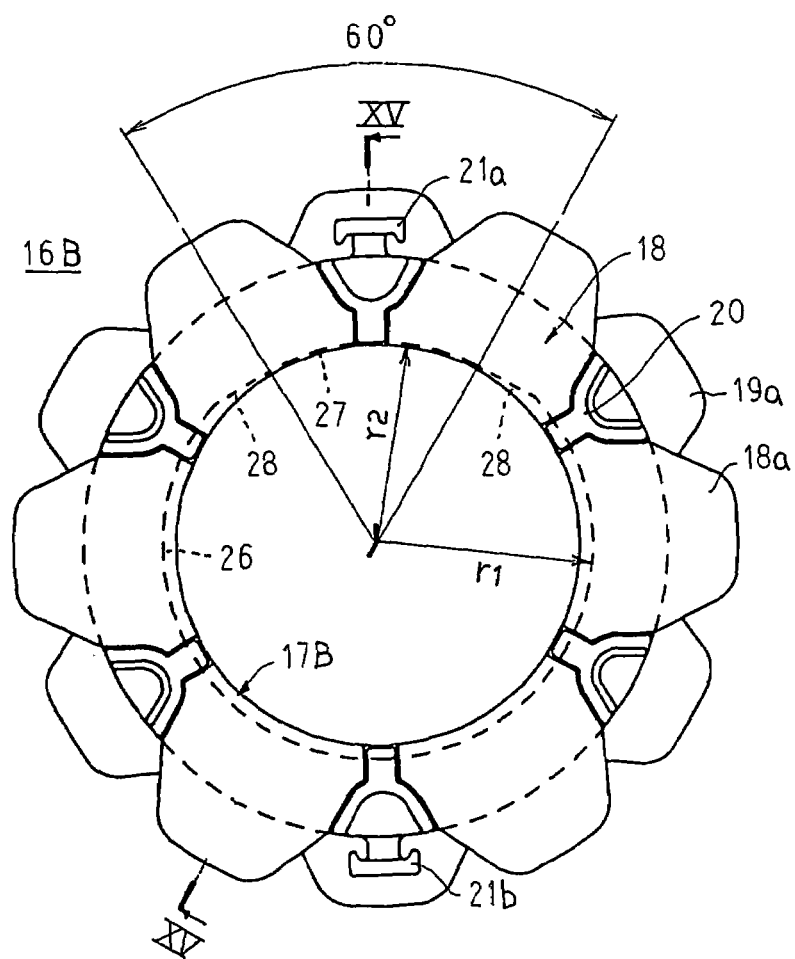
FIG. 14 is a side elevation showing a bobbin used in a rotor for a rotary electric machine according to Embodiment 4 of the present invention.
Figure 15:
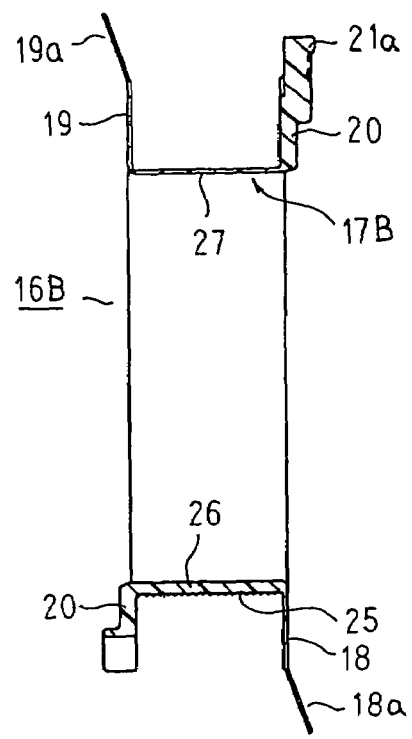
FIG. 15 is a cross section taken along line XV—XV in FIG. 14 viewed from the direction of the arrows.

FIG. 14 is a side elevation showing a bobbin used in a rotor for a rotary electric machine according to Embodiment 4 of the present invention, and FIG. 15 is a cross section taken along line XV—XV in FIG. 14 viewed from the direction of the arrows.

A drum portion 17B of a bobbin 16B in Embodiment 4 is constituted by: a large radius portion 26 having a radius r1; a small radius portion 27 having a radius r2(<r1); and a linking portion 28 extending tangentially to the small radius portion 27 and connecting smoothly with the large radius portion 26. Guiding grooves 25 are formed in the outer circumferential wall surface of the large radius portion 26, but the guiding grooves 25 are not formed in the small radius portion 27. The small radius portion 27 is formed over a 60-degree range relative to a circumferential direction of the drum portion 17B, and a securing portion 21a is positioned radially outside within the region where the small radius portion 27 is formed. In addition, although not shown, crossover points C in each of the layers of a coil field are formed in a region radially outside the small radius portion 27 in a similar manner to Embodiment 2 above so as not to overlap each other in a radial direction. Moreover, the rest of this embodiment is constructed in a similar manner to Embodiment 3 above.

According to Embodiment 4, because the crossover points C in each of the layers of the coil field are formed in a region radially outside the small radius portion 27, the increase in the outside diameter of the coil field accompanying formation of the crossover points C is canceled out by the small radius portion 27 of the drum portion 17B, making the outside diameter of the coil field generally uniform. As a result, because the number of layers in the coil field able to avoid contact between the coil wire 15 and the inner circumferential wall surfaces of the claw-shaped magnetic poles 13 can be increased, the occurrence of damage to the electrically-insulating coating of the coil wire 15 is suppressed, and a rotary electric machine having an increased number of winds of coil wire 15 can be obtained.

Generally, if the inside diameter of the drum portion 16B is kept constant, the radius r2 of the small radius portion 27 cannot be reduced very much. If the increase in the outside diameter of the coil field accompanying formation of the crossover points C is large, it is necessary for (r1–r2) to be increased in order to cancel out the increase in the outside diameter thereof. Thus, an (r1–r2) capable of canceling out the increase in the outside diameter of the coil field accompanying formation of the crossover points C must be achieved by increasing the radius r1 of the large radius portion 26. However, increasing the radius r1 of the large radius portion 26 without changing the size of the pole core 12, leads to a reduction in the winding space for the coil wire 15, thereby reducing the magnetomotive force of the rotor coil.

However, in Embodiment 4, because the crossover points C in each of the layers of the coil field are distributed circumferentially in a region radially outside the small radius portion 27, the increase in the outside diameter of the coil field accompanying formation of the crossover points C is reduced. Thus, because it is not necessary to reduce the radius r2 of the small radius portion 27 very much, the increase in the outside diameter of the coil field accompanying formation of the crossover points C can be canceled out without increasing the radius of the large radius portion 26. As a result, winding space for the coil wire 15 is ensured, suppressing reductions in the magnetomotive force of the rotor coil.

A circumferential range θ in which the small radius portion 27 is formed will now be explained.

If the circumferential range θ is reduced, the range over which the crossover points C are distributed in a circumferential direction is also reduced. If the circumferential range θ is less than 40 degrees, the crossover points C are concentrated in a narrow circumferential range, making the circumferential distance between the crossover points C extremely short. Thus, even if the crossover points C do not overlap in a radial direction, the increase in the outside diameter of the coil field accompanying formation of the crossover points C in upper layers is increased significantly due to the influence of the crossover points C positioned in lower layers.

If the circumferential range θ is too large, the region where the guiding grooves 25 are not formed becomes large. Axial movement of the coil wire 15 wound into the first layer (the lowest layer) ceases to be regulated in a range exceeding 80 degrees in a circumferential direction, and when the coil wire 15 is wound into the second layer, the coil wire 15 in the first layer positioned in the region where the guiding grooves 25 are not formed may move in an axial direction, giving rise to winding disturbances.

Thus, if the circumferential range θ is set to greater than or equal to 40 degrees and less than or equal to 80 degrees, preferably to 60 degrees, the increase in the outside diameter of the coil field resulting from the crossover points C can be suppressed, and the occurrence of winding disturbances during the process of winding the coil wire 15 can also be suppressed.

Embodiment 5

Figure 16:
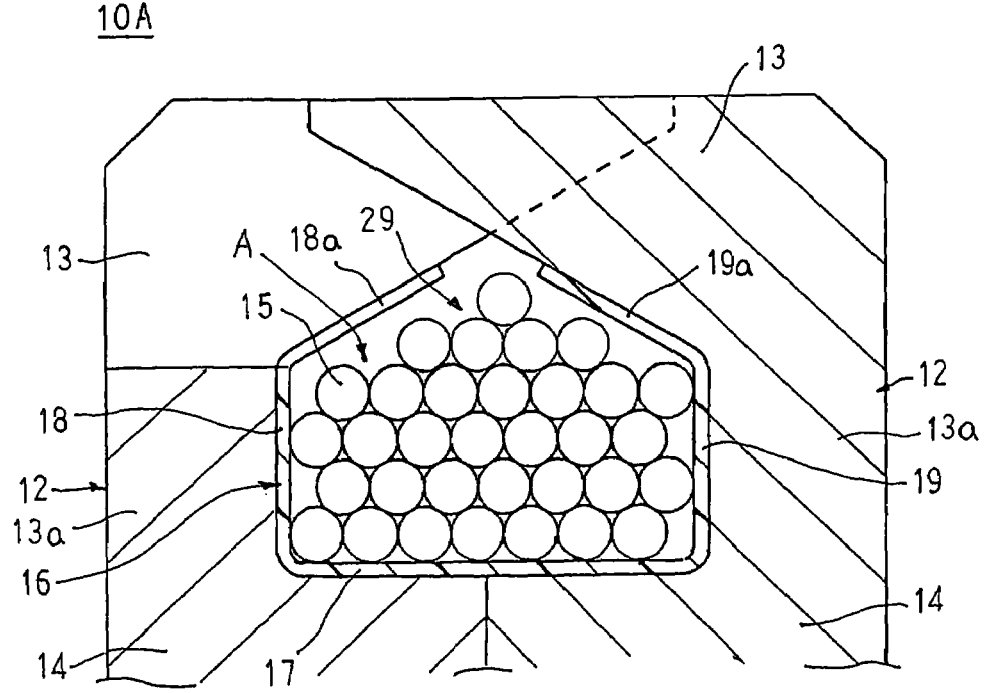
FIG. 16 is a cross section showing part of a rotor for a rotary electric machine according to Embodiment 5 of the present invention.
Figure 17:
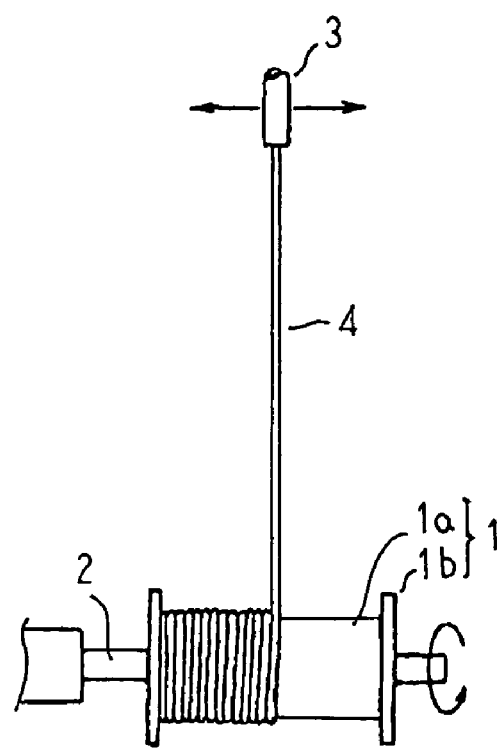
FIG. 17 is a front elevation explaining a conventional method for manufacturing a rotor coil of a rotary electric machine.

FIG. 16 is a cross section showing part of a rotor for a rotary electric machine according to Embodiment 5 of the present invention.

In Embodiment 5, as shown in FIG. 16, a coil field A is constructed by winding a coil wire 15 onto a bobbin 16 in seven columns and four layers, and then a coil field peaked winding portion 29 is constructed by further winding one layer of four columns and winding one turn on top of that. Moreover, the rest of this embodiment is constructed in a similar manner to Embodiment 1 above.

In a rotor 10A according to Embodiment 5, because a coil field peaked winding portion 29 is formed on an upper portion of the coil field A by winding a coil wire 15 into four columns and winding one turn on top of that, the number of winds of coil wire 15 can be increased using clear space between the coil field A and the claw-shaped magnetic poles 13 of the pole core 12. Thus, the magnetomotive force of the rotor coil is increased, enabling output of the rotary electric machine to be improved.

Because the coil field peaked winding portion 29 is constituted by a smaller number of columns than the number of columns in each of the layers of the coil field A, it can be disposed in the clear space between the coil field A and the claw-shaped magnetic poles 13 of the pole core 12 while still avoiding contact with the claw-shaped magnetic poles 13.

Here, the coil field peaked winding portion 29 need only be constituted by a plurality of layers with a smaller number of columns than the number of columns in each of the layers of the coil field A. It is desirable for the number of columns in each of the layers of the coil field peaked winding portion 29 to decrease gradually in an upward direction to match the shape of the clear space between the coil field A and the claw-shaped magnetic poles 13 of the pole core 12.

Moreover, the rotor according to the present invention can be applied, for example, to a rotary electric machine such as an alternator, an alternating-current motor, an alternating current electric generator-motor, etc., mounted to an automotive vehicle such as a passenger car, a truck, an electric train, etc.

Furthermore, in Embodiments 3 and 4 above, axial movement of the coil wire 15 wound into the first layer (the lowest layer) is regulated by providing guiding grooves 25, but the means for regulating the axial movement of the coil wire 15 is not limited to the guiding grooves 25 and, for example, an adhesive material, a bonding agent, etc., may also be formed on the outer circumferential surface of the drum portion in a process preceding the winding of the coil wire 15.

In each of the above embodiments, the coil field A is formed into four layers of seven columns or four layers of six columns to facilitate explanation, but the number of columns and the number of layers in the coil field A is not limited thereto.

INDUSTRIAL APPLICABILITY

As explained above, in a rotor according to the present invention, because a coil field of a rotor coil is constructed so as to have a uniform outside diameter by winding a coil wire into an aligned state, the coil field can be constructed to a high density and be less likely to collapse while avoiding contact between claw-shaped magnetic poles and the coil wire, making it useful as a rotor for the rotary electric machine such as an automotive alternator, etc., for mounting to an automotive vehicle such as an automobile, etc.

The invention claimed is:

1. A rotor for a rotary electric machine, comprising:
a pair of pole cores in each of which a plurality of claw-shaped magnetic poles having a tapered shape are formed at a uniform angular pitch in a circumferential direction on an outer circumferential edge portion of a cylindrical base portion such that a direction of taper of said claw-shaped magnetic poles is aligned in an axial direction, said pair of pole cores being constructed by placing end surfaces of said base portions in contact with each other such that said claw-shaped magnetic poles intermesh;
a bobbin constructed into an annular shape having an angular C-shaped cross section by disposing first and second flange portions so as to extend radially outward from two axial end portions of a cylindrical drum portion, said bobbin being mounted to said base portions so as to be held between root portions of said claw-shaped magnetic poles of said pair of pole cores; and
a rotor coil having a coil field constructed by winding a coil wire having a circular cross section onto an outer circumference of said drum portion of said bobbin in multiple layers so as to make columns in each of said layers equal in number in an axial direction,
wherein:
odd numbered layers of said coil field are constructed such that said coil wire is wound for approximately one turn around said drum portion in contact with an inner peripheral wall surface of said first flange portion, then wound into a plurality of columns in an axial direction such that said columns of said coil wire contact each other, and said coil wire in a final column forms a gap S relative to an inner peripheral wall surface of said second flange portion;
even numbered layers of said coil field are constructed such that said coil wire is wound for approximately one turn around said drum portion in contact with an inner peripheral wall surface of said second flange portion, then wound into a plurality of columns in an axial direction such that said columns of said coil wire contact each other, and said coil wire in a final column forms said gap S relative to an inner peripheral wall surface of said first flange portion;
said gap S satisfies an expression $D/4 \leq S \leq D/2$ relative to a diameter D of said coil wire; and,
said coil field is constructed such that crossover points formed by said coil wire in radially-adjacent layers do not overlap in a radial direction.

2. The rotor for the rotary electric machine as set forth in claim 1, wherein coil wire guiding grooves running in a circumferential direction are formed on an outer circumferential surface of said drum portion at an array pitch of D in an axial direction.

3. The rotor for the rotary electric machine as set forth in claim 2,
wherein said drum portion has a small radius portion in which a wall thickness of said drum portion is formed so as to be thin over a predetermined circumferential range, said small radius portion constituting a region where said coil wire guiding grooves are not formed; and wherein crossover points formed by said coil wire in radially-adjacent layers are all positioned radially outside said small radius portion without overlapping each other in a radial direction.

4. The rotor for the rotary electric machine as set forth in claim 3, wherein said small radius portion is formed over a range of greater than or equal to 40 degrees and less than or equal to 80 degrees in a circumferential direction.

5. The rotor for the rotary electric machine as set forth in claim 1, wherein a plurality of thick-walled ribs are formed on said first and second flange portions of said bobbin.

6. The rotor for the rotary electric machine as set forth in claim 1, wherein said bobbin is made of nylon 66 containing glass fiber.

7. The rotor for the rotary electric machine as set forth in claim 1, wherein said coil wire is wound onto an upper portion of said coil field in a plurality of layers having fewer columns than said number of columns in each of said layers of said coil field.

8. A rotor for a rotary electric machine, comprising:
a pair of pole cores in each of which a plurality of claw-shaped magnetic poles having a tapered shape are formed at a uniform angular pitch in a circumferential direction on an outer circumferential edge portion of a cylindrical base portion such that a direction of taper of said claw-shaped magnetic poles is aligned in an axial direction, said pair of pole cores being constructed by placing end surfaces of said base portions in contact with each other such that said claw-shaped magnetic poles intermesh;
a bobbin constructed into an annular shape having an angular C-shaped cross section by disposing first and second flange portions so as to extend radially outward from two axial end portions of a cylindrical drum portion, said bobbin being mounted to said base portions so as to be held between root portions of said claw-shaped magnetic poles of said pair of pole cores; and
a rotor coil having a coil field constructed by winding a coil wire having a circular cross section onto an outer circumference of said drum portion of said bobbin in multiple layers so as to make columns in each of said layers equal in number in an axial direction,
wherein:
odd numbered layers of said coil field are constructed such that said coil wire is wound for approximately one turn around said drum portion in contact with an inner peripheral wall surface of said first flange portion, then wound into a plurality of columns in an axial direction with a gap G between said coil wire, and said coil wire in a final column forms a gap S relative to an inner peripheral wall surface of said second flange portion;
even numbered layers of said coil field are constructed such that said coil wire is wound for approximately one turn around said drum portion in contact with an inner peripheral wall surface of said second flange portion, then wound into a plurality of columns in an axial direction with gap G between said coil wire, and said coil wire in a final column forms gap S relative to an inner peripheral wall surface of said first flange portion; and
said gap S satisfies an expression $S=(D+G)/2$ relative to a diameter D of said coil wire and said gap G.

9. The rotor for the rotary electric machine as set forth in claim 8, wherein said coil field is constructed such that crossover points formed by said coil wire in radially-adjacent layers do not overlap in a radial direction.

10. The rotor for the rotary electric machine as set forth claim 8, wherein coil wire guiding grooves running in a circumferential direction are formed on an outer circumferential surface of said drum portion at an array pitch of $(D+G)$ in an axial direction.

11. The rotor for the rotary electric machine as set forth in claim 10, wherein said gap G is constructed so as to satisfy an expression $0 \leq G \leq 0.04D$.

12. The rotor for the rotary electric machine as set forth in claim 10,
wherein said drum portion has a small radius portion in which a wall thickness of said drum portion is formed so as to be thin over a predetermined circumferential range, said small radius portion constituting a region where said coil wire guiding grooves are not formed; and
wherein crossover points formed by said coil wire in radially-adjacent layers are all positioned radially outside said small radius portion without overlapping each other in a radial direction.

13. The rotor for the rotary electric machine as set forth in claim 12, wherein said small radius portion is formed over a range of greater than or equal to 40 degrees and less than or equal to 80 degrees in a circumferential direction.

14. The rotor for the rotary electric machine as set forth in claim 8, wherein a plurality of thick-walled ribs are formed on said first and second flange portions of said bobbin.

15. The rotor for the rotary electric machine as set forth in claim 8, wherein said bobbin is made of nylon 66 containing glass fiber.

16. The rotor for the rotary electric machine as set forth in claim 8, wherein said coil wire is wound onto an upper portion of said coil field in a plurality of layers having fewer columns than said number of columns in each of said layers of said coil field.

* * * * *